United States Patent
Ogura

(10) Patent No.: US 12,473,445 B2
(45) Date of Patent: Nov. 18, 2025

(54) INK COMPOSITION FOR AQUEOUS BALLPOINT PENS

(71) Applicant: MITSUBISHI PENCIL COMPANY, LIMITED, Shinagawa-ku (JP)

(72) Inventor: Kosuke Ogura, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 820 days.

(21) Appl. No.: 17/771,757

(22) PCT Filed: Oct. 21, 2020

(86) PCT No.: PCT/JP2020/039585
§ 371 (c)(1),
(2) Date: Apr. 25, 2022

(87) PCT Pub. No.: WO2021/085270
PCT Pub. Date: May 6, 2021

(65) Prior Publication Data
US 2022/0411651 A1 Dec. 29, 2022

(30) Foreign Application Priority Data
Oct. 29, 2019 (JP) .................. 2019-196109

(51) Int. Cl.
C09D 11/18 (2006.01)
C09D 11/17 (2014.01)

(52) U.S. Cl.
CPC ............. C09D 11/18 (2013.01); C09D 11/17 (2013.01)

(58) Field of Classification Search
CPC ................................. C09D 11/17; C09D 11/18
USPC ............................................................ 524/88
See application file for complete search history.

(56) References Cited

U.S. PATENT DOCUMENTS

| | | | |
|---|---|---|---|
| 6,395,805 B1 * | 5/2002 | Takao | C09D 17/002 |
| | | | 428/407 |
| 6,498,203 B1 | 12/2002 | Kito et al. | |
| 6,511,534 B1 * | 1/2003 | Mishina | C09D 11/32 |
| | | | 106/31.4 |
| 8,080,098 B2 | 12/2011 | Kurihara et al. | |
| 10,851,252 B2 | 12/2020 | Miyoshi et al. | |
| 2011/0077319 A1 * | 3/2011 | Yasuda | C09B 69/109 |
| | | | 524/502 |
| 2012/0083567 A1 * | 4/2012 | Hosoya | C09D 11/324 |
| | | | 524/516 |
| 2019/0010344 A1 | 1/2019 | Ichikawa et al. | |
| 2019/0211220 A1 * | 7/2019 | Miyoshi | B43K 7/00 |
| 2022/0389250 A1 | 12/2022 | Ogura | |
| 2023/0048616 A1 | 2/2023 | Ogura | |

FOREIGN PATENT DOCUMENTS

| | | |
|---|---|---|
| EP | 1 006 162 A1 | 6/2000 |
| EP | 1 803 785 A1 | 7/2007 |
| EP | 3 505 577 A1 | 7/2019 |
| EP | 3 995 546 A1 | 5/2022 |
| EP | 4 083 148 A1 | 11/2022 |
| JP | 2001-19889 A | 1/2001 |
| JP | 2001-152060 A | 6/2001 |
| JP | 2004-277507 A | 10/2004 |
| JP | 2010150331 A * | 7/2010 |
| JP | 2016-124179 A | 7/2016 |
| JP | 2016-124950 A | 7/2016 |
| JP | 2016-124951 A | 7/2016 |
| JP | 2017-222113 A | 12/2017 |
| JP | 2018-109113 A | 7/2018 |
| WO | WO 2017/119480 A1 | 7/2017 |
| WO | WO 2019/082888 A1 | 5/2019 |
| WO | WO 2019/146539 A1 | 8/2019 |

OTHER PUBLICATIONS

International Search Report issued Dec. 28, 2020 in PCT/JP2020/039585 filed on Oct. 21, 2020, 3 pages.
D. Satas and Arthur A. Tracton "Coatings Technology Handbook (Second Edition)" Copyright © 2001 by Marcel Dekker, Inc., 270 Madision Avenue, New York. New York 10016 All Right Reseved. chttp://www.jingjilei.cn/n/dsrqw/book/base/11029577/b565d2ca149742278f289591744755c9/4d9fdc3e3504caa23c2a73ecedcbc74f.shtml?dm=-84 (with partial English translation), p. 455 (4 total pages).
Extended European Search Report issued Oct. 27, 2023, in corresponding European Patent Application No. 20883637.9, 6 pages.

* cited by examiner

Primary Examiner — Ruiyun Zhang
(74) Attorney, Agent, or Firm — Oblon, McClelland, Maier & Neustadt, L.L.P.

(57) ABSTRACT

An aqueous ink composition suitable for ballpoint pens may achieve excellent smooth writing without causing deterioration of the smooth writing and wear of a tip socket while colored resin particles encapsulating a pigment are used. An embodiment of such ink compositions is an aqueous ink composition suitable for ballpoint pens containing at least colored resin particles (A) encapsulating a pigment (a) and non-colored resin particles (B) containing no pigment.

20 Claims, No Drawings

INK COMPOSITION FOR AQUEOUS BALLPOINT PENS

CROSS-REFERENCE TO RELATED APPLICATIONS

The present application is the national stage of international application PCT/JP2020/039585, filed on Oct. 21, 2020, and claims the benefit of the filing date of Japanese Appl. No. 2019-196109, filed on Oct. 29, 2019.

TECHNICAL FIELD

The present specification relates to an ink composition for aqueous ballpoint pens using colored resin particles encapsulating a pigment.

BACKGROUND ART

An aqueous ink containing an aqueous dispersion of pigment-encapsulated polymer particles having a predetermined average particle diameter and containing (A) a hydrophilic polymer, (B) a hydrophobic polymer, and (C) a pigment (e.g., see Patent Document 1) and an ink composition for writing instruments formed by using a microcapsule pigment encapsulating a dye or pigment in a microcapsule wall (e.g., see Patent Document 2) have been known.

The microcapsule pigments and the like encapsulating pigments described in Patent Documents 1 and 2 described above contain, in a microcapsule wall, an ordinary dye or ordinary pigment, for which adjustment of particle diameter or particle distribution is easy, but may cause deterioration in smooth writing or wear of a tip socket when used for aqueous ballpoint pens.

CITATION LIST

Patent Document

Patent Document 1: JP 2004-277507 A (Claims, Examples, etc.)
Patent Document 2: JP 2010-150331 A (Claims, Paragraph [0006], Examples, etc.)

SUMMARY OF INVENTION

Technical Problem

In light of the problems in the related art described above, the present disclosure is to solve these problems. An object is to provide an ink composition for aqueous ballpoint pens achieving excellent smooth writing without causing deterioration of the smooth writing and wear of a tip socket even when colored resin particles encapsulating a pigment are used.

Solution to Problem

As a result of intensive studies in light of the above-mentioned problems and the like, the present inventor has found that an ink composition for aqueous ballpoint pens for the object described above can be obtained by containing at least colored resin particles encapsulating a pigment and colored resin particles having specific physical properties, and thus has completed the present disclosure.

Thus, an ink composition for aqueous ballpoint pens of the present disclosure is characterized in that it contains at least colored resin particles (A) encapsulating a pigment (a) and non-colored resin particles (B) containing no pigment.

A resin component in each of the colored resin particles (A) and (the non-colored resin particles (B)) is preferably urethane-based.

A content ratio of the non-colored resin particles (B) to the colored resin particles (A), [(B)/(A)], is preferably 0.05 to 1.0 by mass.

A ratio of average particle diameters of the non-colored resin particles (B) to the colored resin particles (A), [(B)/(A)], is preferably 0.5 to 4.0.

Advantageous Effects of Invention

According to the present disclosure, provided is an ink composition for aqueous ballpoint pens achieving excellent smooth writing without causing deterioration of smooth writing and wear of a tip socket while colored resin particles encapsulating a pigment are used.

In the present specification, both of general explanation described above and detailed explanation described below are exemplification and explanation and do not limit the present disclosure described in Claims.

DESCRIPTION OF EMBODIMENTS

At least some embodiments of the present disclosure will be described in detail below. However, note that the technical scope of the present disclosure is not limited to the embodiments described below but includes the invention described in the claims and equivalents thereof.

The ink composition for aqueous ballpoint pens of the present disclosure contains at least colored resin particles (A) encapsulating a pigment (a) and non-colored resin particles (B) containing no pigment.

Pigment (a)

In the present disclosure, the type of pigment (a) that is encapsulated in the colored resin particle (A) is not particularly limited, and any pigment can be used from among inorganic and organic pigments commonly used in ink compositions for aqueous ballpoint pens and the like. Examples of the inorganic pigments include carbon black, titanium oxide, zinc oxide, iron oxide, chromium oxide, and ultramarine.

Examples of the organic pigments include azo lake, insoluble azo pigments, chelate azo pigments, phthalocyanine pigments, perylene and perinone pigments, anthraquinone pigments, quinacridone pigments, lake dyes, nitro pigments, and nitroso pigments. One type of these may be used alone, or a combination of two or more types of these may be used.

The content of the pigment (a) encapsulated in the colored resin particle (A) is preferably 5 to 40 mass %, more preferably 10 to 35 mass %, and particularly preferably 15 to 25 mass %.

When the content of the pigment (a) is less than 5 mass %, the coloring strength is insufficient and visibility of a drawn line may decrease. On the other hand, when the content is greater than 40 mass %, the amount of the pigment is excessive, and color reproducibility may be deteriorated.

Colored Resin Particle (A)

The colored resin particle (A) of the present disclosure is formed from, at least, a microcapsule pigment encapsulating the pigment (a) described above, and can be produced, for example, by microencapsulation, specifically, enclosing a material containing at least the pigment (a) described above in a shell layer (shell) which is formed from a wall forming material (wall material), so as to achieve a predetermined particle size.

Furthermore, the colored resin particle (A) of the present disclosure may be formed from a microcapsule pigment encapsulating a synergist (pigment derivative) together with the pigment (a) described above. The synergist (pigment derivative) to be used is a substance used in a preferred embodiment to make it easier for the pigment (a) to be introduced in the resin particle during formation of the colored resin particle and to prevent shedding of the pigment (a) from the colored resin particle. It is a derivative having a structure similar to that of the pigment (a), and is a compound exhibiting strong interaction with the pigment (a). Furthermore, the synergist also exhibits strong interaction with a dispersant described below that is preferably used during production of the colored resin particle.

By allowing at least the synergist to be contained in addition to the pigment (a) in the colored resin particle, because the synergist has a similar structure (common backbone) as that of the pigment (a), the synergist is adsorbed on the resin of the colored resin particle as well as adsorbed on the pigment surface, and thus the pigment (a) readily enters the resin particle, and the shedding prevention effect is achieved.

Such interaction of the synergist is believed to be van der Waals force, and it is presumed that firm and practical adsorption can be achieved due to the interaction on the entirety of a flat and wide face of the pigment backbone. Note that, typically, the synergist is used as a dispersion aid of a pigment in a liquid medium; however, in the present disclosure, by allowing the synergist to be contained together with the pigment (a) in the colored resin particle to be formed, the effect of the present disclosure can be further exhibited.

As the synergist that can be used, a synergist that is appropriate for the pigment (a) to be used can be used. Commercially available products of synergists for the color of the pigment (a), specifically, for carbon black, for yellow pigments, for azo pigments, and for phthalocyanine pigments can be used. Examples of the commercially available products having acidic functional groups include Solsperse 5000 (phthalocyanine pigment derivative), Solsperse 12000 (phthalocyanine pigment derivative), and Solsperse 22000 (azo pigment derivative) available from The Lubrizol Corporation, BYK-SYNERGIST 2100 (phthalocyanine pigment derivative) and BYK-SYNERGIST 2105 (yellow pigment derivative) available from BYK-Chemie Japan K.K., EFKA 6745 (phthalocyanine pigment derivative) and EFKA 6750 (azo pigment derivative) available from BASF Japan Ltd., and Synergist Yellow-8020, 8404, 9043, 4827 (yellow pigment derivative); Synergist Red-3953, 4327, 4474, 4858, 4966, 5507, 5525, 5909, 6006, 6547 (azo pigment derivative); Synergist Blue-6831, 7215, 7438, 7854, 0785, 0785A (phthalocyanine pigment derivative); and Synergist Violet-6965, 7349, 7572, 7988 (phthalocyanine pigment derivative) available from Disper Material R & D Corp. One type of these may be used alone, or two or more types of these may be used in combination.

The content of these synergists in the colored resin particle is preferably varied based on the pigment type to be used and the used amount thereof, and from the perspective of suitably exhibiting blending effect of the synergist and effect of the present disclosure, the pigment to be used and the synergist are preferably contained in a certain blending ratio. The mass ratio of synergist/pigment is preferably 0.01 to 0.2, and more preferably 0.05 to 0.15. By setting the mass ratio of synergist/pigment to 0.01 or greater, the pigment is less likely to be shed from the colored resin particle. On the other hand, by setting the mass ratio to 0.2 or less, aggregation of the pigment in the colored resin particle is suppressed, and deterioration of smooth writing is suppressed.

The colored resin particle (A) of the present disclosure can be produced by microencapsulating a material containing at least the pigment (a) described above or a material containing at least the pigment (a) and the synergist described above in a manner that a predetermined particle size is achieved.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

Preferably, from the perspective of ease of production and quality, a resin component (shell component) forming a microcapsule is preferably a thermosetting resin such as an epoxy resin, urethane, urea, or urea-urethane, and is particularly preferably a urethane-based resin, such as urethane, urea, or urea-urethane because the microcapsule can accommodate large amounts of the components, the types of the components contained therein are less limited, and redispersibility is excellent. The urethane (polyurethane resin), urea (polyurea resin), and urea-urethane (polyurea resin/polyurethane resin) used in the formation of the shell layer are formed by reacting an isocyanate component and an amine component or an alcohol component. Furthermore, the epoxy resin used in the formation of the shell layer is formed by reacting with a curing agent such as an amine component.

Examples of the isocyanate component that can be used include 2,4-tolylene diisocyanate, 2,6-tolylene diisocyanate, diphenylmethane diisocyanate, polymeric diphenylmethane diisocyanate, hydrogenated diphenylmethane diisocyanate, 1,5-naphthalene diisocyanate, 3,3'-dimethyldiphenyl-4,4'-diisocyanate, hexamethylene diisocyanate, isophorone diisocyanate, m-phenylene diisocyanate, p-phenylene diisocyanate, trans-cyclohexane 1,4-diisocyanate, diphenyl ether diisocyanate, xylylene diisocyanate, hydrogenated xylylene diisocyanate, 2,6-diisocyanate caproic acid, tetramethyl-m-xylylene diisocyanate, tetramethyl-p-xylylene diisocyanate, trimethylhexamethylene diisocyanate, triphenylmethane triisocyanate, tris (isocyanatephenyl) thiophosphate, isocyanate alkyl 2,6-diisocyanate capronate, 1,6,11-undecane triisocyanate, 1,8-diisocyanate-4-isocyanatemethyloctane, 1,3,6-hexamethylene triisocyanate, and bicycloheptane triisocyanate.

Furthermore, examples of the isocyanate component include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4-biphenyl-diisocyanate, 3,3'-dimethylphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, and cyclohexylene-1,4-diisocyanate; triisocyanates such as 4,4',4"-triphenylmethane triisocyanate and toluene-2,4,6-triisocyanate; tetraisocyanates such as 4,4'-dimethyldiphenylmethane-2,2',5,5'-tetraisocyanate; and isocyanate prepolymers such as adducts of hexamethylene diisocyanate and trimethylolpropane, adducts of 2,4-tolylene diisocyanate and trimethylolpropane, adducts of xylylene diisocyanate and trimethylolpropane, and adducts of tolylene diisocyanate and hexanetriol. These isocyanate components may be used alone or as a mixture.

Specific examples of the amine component that can be used include aliphatic amines such as ethylene diamine, hexamethylene diamine, diaminocyclohexane, piperazine, diethylenetriamine, triethylenetetramine, tetraethylenepentamine, iminobispropylamine, diaminoethyl ether, 1,4-diaminobutane, pentamethylenediamine, 2-methylpiperazine, 2,5-dimethylpiperazine, 2-hydroxytrimethylenediamine, diethylaminopropylamine, diaminopropylamine, diaminopropane, 2-methylpentamethylenediamine, and xylenediamine; and m-phenylenediamine, triaminobenzene, 3,5-tolylenediamine, diaminodiphenylamine, diaminonaphthalene, t-butyltoluenediamine, diethyltoluenediamine, and diaminophenol. Among these amine components, aromatic amines such as phenylenediamine, diaminophenol, and triaminobenzene are preferable.

Specific examples of the alcohol component that can be used include polyols having two or more hydroxyl groups, such as ethylene glycol, 1,3-propanediol, 1,4-butanediol, 1,5-pentanediol, 1,6-hexanediol, glycerin, catechol, resorcinol, and hydroquinone. These alcohol components may be used alone or as a mixture. Furthermore, the alcohol component and the amine component may be mixed for use.

For the formation of the shell layer from a urethane-based resin of urethane, urea, or urea-urethane, the shell layer can be formed, for example, by a production method 1) performing interfacial polymerization by dispersing a monomer component of at least one of urethane, urea or urethane-urea, and a pigment component, or by a production method 2) including an emulsification step of dispersing an oily component (oily phase) containing an isocyanate component in an aqueous solvent (aqueous phase) to prepare an emulsified liquid, and an interfacial polymerization step of performing interfacial polymerization by adding, to the emulsified liquid, at least one of the amine component or the alcohol component.

In the above production method 2), a solvent can be used in the preparation of the emulsified liquid. For example, phenyl glycol, benzyl alcohol, ethylene glycol monobenzyl ether, ethyl acetate, alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin can be used. These solvents may be used alone or as a mixture.

On the other hand, a protective colloid may be included in advance in the aqueous phase that is used to emulsify the oily phase. A water-soluble polymer can be used as the protective colloid, and can be appropriately selected from among known anionic polymers, nonionic polymers, and amphoteric polymers. Particularly preferably, polyvinyl alcohol, gelatin, and a cellulose polymer compound are contained.

The aqueous phase may also contain a surfactant. The surfactant can be the one appropriately selected out of anionic and nonionic surfactants, which do not act on the protective colloid to produce precipitation or aggregation. Preferred surfactants may include sodium alkylbenzene sulphonate (e.g., sodium lauryl sulfate), dioctyl sodium sulfosuccinate, and polyalkylene glycol (e.g., polyoxyethylene nonylphenyl ether). The oily phase made in the manner as described above is added to the aqueous phase, and emulsified using mechanical force. Then, the temperature of the system is increased as necessary, thereby causing interfacial polymerization at the oily droplet interface, so that particles are formed. In addition, desolvation can be performed at the same time as, or after the end of, the interfacial polymerization reaction. After the interfacial polymerization reaction and desolvation, the particles are separated from the aqueous phase, washed and then dried to obtain capsule particles.

Furthermore, the epoxy resin used in the formation of the shell layer is formed by reacting with a curing agent such as the amine component or the like, and can be formed using each of the microencapsulation methods described above, for example, by interfacial polymerization. Usable epoxy resins are epoxy resins having two or more epoxy groups in one molecule, which are commonly used without being limited in molecular weight, molecular structure, or the like. Examples thereof include aromatic epoxy resins such as bisphenol A epoxy resins such as bisphenol A diglycidyl ether epoxy resin, bisphenol F epoxy resins, novolac epoxy resins, cresol novolac epoxy resins, and biphenyl epoxy resins; naphthalene type polyfunctional epoxy resins; glycidyl ether epoxy resins of polycarboxylic acids; glycidyl ester epoxy resins of the same; alicyclic epoxy resins obtained by epoxidation of cyclohexane derivatives such as cyclohexane polyether epoxy resin and hydrogenated bisphenol A epoxy resin; and cycloaliphatic epoxy resins such as dicyclopentadiene epoxy resins. These epoxy resins can be used alone, or two or more thereof can be mixed for use.

In the present disclosure, for formation of the colored resin particles, a dispersant is preferably used together with the pigment described above or the pigment and the synergist described above.

Examples of the dispersant that can be used include AJISPER PB821, AJISPER PB822, and AJISPER PB711 (all available from Ajinomoto Fine-Techno Co., Inc.), DISPARLON DA-705, DISPARLON DA-325, DISPARLON DA-725, DISPARLON DA-703-50, and DISPARLON DA-234 (available from Kusumoto Chemicals, Ltd.), DISPERBYK-111, DISPERBYK-2000, DISPERBYK-2001, DISPERBYK-2020, DISPERBYK-2050, and DISPERBYK-2150 (available from BYK-Chemie Japan K.K.), EFKA4010, EFKA4009, EFKA4015, EFKA4047, EFKA4050, EFKA4055, EFKA4060, EFKA4080, and EFKA4520 (available from BASF Japan Ltd.), and TEGO Dispers 655, TEGO Dispers 685, and TEGO Dispers 690 (available from Evonik Japan Co., Ltd.). In addition, other known products that are commonly and commercially available as dispersants can be also used. The dispersant is not limited to the examples described above.

The content of the dispersant in the colored resin particle is varied based on the type and the like of pigment and synergist to be used, and from the perspective of suitably exhibiting synergistic action of the pigment and the synergist and effect of the present disclosure, the content is preferably 2 to 20 mass o, and more preferably 3 to 15 mass %.

In the present disclosure, through forming a shell layer by the forming means described above, a colored resin particle (A) formed from a microcapsule pigment encapsulating at least the pigment (a) or a colored resin particle (A) formed from a microcapsule pigment encapsulating at least the pigment (a) and the synergist is obtained.

In the present disclosure, the content of at least the pigment and the content in the case where the synergist is used vary from the perspective of optionally controlling dispersibility, specific gravity, and particle diameter and also from the perspective of color development. The aqueous phase component (water, PVA) and the oil phase component (solvent) used during the production do not substantially remain when colored resin particles are formed. Thus, through polymerizing the raw materials used during the production of the colored resin particles (e.g., pigment, synergist, dispersant, and resin component) by adjusting the pigment, the synergist, the dispersant, and the resin component (balance) to be in preferred ranges, colored resin particles having each of components in the predetermined preferred ranges described above can be obtained.

Furthermore, in the present disclosure, the colored resin particles (A) formed from a microcapsule pigment encapsulating at least the pigment and the like can be adjusted to have a predetermined average particle diameter, for example, an average particle diameter of 0.1 to 30 μm, based on the ballpoint pen structure. Preferably, the range of 0.5 to 20 μm satisfies practical usability for the structure described above. In the present disclosure (including Examples described below), "average particle size" refers to the value of the particle size (D50) at 50% cumulative volume in the particle size distribution calculated based on the volume measured by a laser diffraction method. Here, the measurement of average particle size by a laser diffraction method can be performed using, for example, a particle size distribution analyzer HRA 9320-X100 which is available from Nikkiso Co., Ltd.

Non-Colored Resin Particle (B)

The non-colored resin particle (B) of the present disclosure is a non-colored resin particle containing no pigment. For example, at least, the non-colored resin particle (B) containing no pigment can be produced by microencapsulating to achieve a predetermined particle size in a similar manner to the production of the colored resin particle (A) described above but except for the components of the pigment, the dispersant, and the synergist.

The non-colored resin particle (B) is produced, for example, according to the production of the colored resin particle (A) described above except for the components of the pigment, the dispersant, and the synergist. The non-colored resin particle (B) can be produced by microencapsulating in a manner that a predetermined particle size is achieved, similarly to the colored resin particle (A) except for not using those components.

For the resin components that are used, the materials used for the colored resin particle (A) described above can be employed, and thus the description of the materials and the production method is omitted.

Ink Composition for Aqueous Ballpoint Pens

The ink composition for aqueous ballpoint pens of the present disclosure contains at least the colored resin particles (A) encapsulating a pigment (a) described above and non-colored resin particles (B) containing no pigment and, for example, is used as an ink composition for aqueous ballpoint pens.

In the present disclosure, the content of the colored resin particle (A) having the characteristics described above is preferably 5 to 25 mass %, and more preferably 10 to 20 mass %, with respect to the total amount of the ink composition for aqueous ballpoint pens.

When the content of the colored resin particles is less than 5 mass %, coloring strength is insufficient and visibility of a drawn line decreases. On the other hand, the content of greater than 25 mass % is not preferable because the viscosity increases and fluidity of the ink may be deteriorated.

In the present disclosure, the content ratio of the non-colored resin particles (B) to the colored resin particles (A), [(B)/(A)], is preferably 0.05 to 1.0, and more preferably 0.05 to 0.5, by mass from the perspective of exhibiting better the effect of the present disclosure.

The ratio of average particle diameters of the non-colored resin particles (B) to the colored resin particles (A), [(B)/(A)], is preferably 0.5 to 4.0, and more preferably 0.5 to 1.5, from the perspective of exhibiting better the effect of the present disclosure and from the perspective of preventing destabilization of the ink due to separation of the colored resin particles (A) and the non-colored resin particles (B) over time.

The ink composition for aqueous ballpoint pens of the present disclosure contains a water-soluble solvent in addition to the colored resin particle (A) and the non-colored resin particle (B) described above. Furthermore, as necessary, a general colorant besides the colored resin particles (A) described above can be appropriately contained in a range in which the effects of the present disclosure would not be impaired. Examples of the water-soluble solvent that can be used include glycols such as ethylene glycol, diethylene glycol, triethylene glycol, propylene glycol, polyethylene glycol, and glycerin; ethylene glycol monomethyl ether, and diethylene glycol monomethyl ether. These solvents may be used alone or as a mixture. The content of the water-soluble solvent is preferably 5 to 40 mass % based on the total amount of the aqueous ink composition for writing instruments.

As the colorant that can be used, for example, a water-soluble dye, a pigment (within a range in which the effects of the present disclosure would not be impaired) such as an inorganic pigment, an organic pigment, a plastic pigment, hollow resin particles having voids within the particles (used as a white pigment) or resin particles (pseudo-pigment) dyed with a basic dye having excellent color development and dispersibility, or the like can be used in an appropriate amount. For the water-soluble dye, a direct dye, an acid dye, an edible dye, or a basic dye can be used in an appropriate amount within a range in which the effects of the present disclosure would not be impaired.

The ink composition for aqueous ballpoint pens of the present disclosure has a feature of containing at least the colored resin particles (A) encapsulating the pigment (a) and the non-colored resin particles (B) containing no pigment. In addition to the colorant other than the colored resin particles and the water-soluble solvent, the ink composition for aqueous ballpoint pens of the present disclosure can appropriately contain, as the balance, water (e.g., tap water, purified water, distilled water, ion exchanged water, or purified water) as a solvent, a dispersant, a lubricant, a thickener, a pH adjuster, a corrosion inhibitor, a preservative or an antibacterial agent, or the like, within a range in which the effects of the present disclosure would not be impaired.

Examples of the dispersant that can be used include nonionic and anionic surfactants, and water-soluble resins. Preferably, water-soluble polymers are used.

Examples of the lubricant that can be used include nonionic types such as fatty acid esters of polyhydric alcohols, higher fatty acid esters of sugars, polyoxyalkylene higher fatty acid esters, and alkyl phosphate esters; anionic types such as phosphate, alkyl sulfonates of higher fatty acid amides, and alkyl allyl sulfonates; derivatives of polyalkylene glycols, and polyether modified silicones, which are also used as surface treating agents for pigments.

As the thickener that can be used, for example, at least one selected from the group consisting of synthetic polymers, cellulose, and polysaccharides is preferred. Specific examples thereof include arabic gum, tragacanth gum, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, starch glycolic acid and salts thereof, polyvinylpyrrolidone, polyvinyl methyl ether, polyacrylic acid and salts thereof, polyethylene oxide, copolymers of vinyl acetate and polyvinylpyrrolidone, and styrene-acrylic acid copolymers and salts thereof.

Examples of the pH adjuster include ammonia, urea, monoethanolamine, diethanolamine, triethanolamine, alkali metal salts of carbonic acid and phosphoric acid such as sodium tripolyphosphate and sodium carbonate, and alkali metal hydroxides such as sodium hydroxide. Furthermore, examples of the corrosion inhibitor include benzotriazole, tolyltriazole, dicyclohexylammonium nitrite, and saponins. Examples of the preservative or antibacterial agent include phenol, omadine sodium, sodium benzoate, thiazoline-based compounds, and benzimidazole compounds.

For the components, such as the dispersant, the lubricant, the thickener, the pH adjuster, the corrosion inhibitor, the preservative, or the antibacterial agent, one type may be used alone, or a combination of two or more types of these may be used. Commercially available products of these polysaccharides, if present, can be used.

The ink composition for aqueous ballpoint pens of the present disclosure can be prepared by appropriately combining at least the colored resin particles (A) encapsulating the pigment (a), the non-colored resin particles (B) containing no pigment, the water-soluble solvent, and other components, depending on the application of ink for ballpoint pens, stirring and mixing the combined components using a stirrer such as a homomixer, a homogenizer, or a disperser, and optionally, filtering or centrifuging the mixture to remove coarse particles in the ink composition.

The ink composition for aqueous ballpoint pens of the present disclosure can be produced by production methods of other aqueous ink compositions without particular difference.

Thus, the ink composition for aqueous ballpoint pens of the present disclosure can be produced by mixing and stirring at least the colored resin particles (A) encapsulating the pigment (a), the non-colored resin particles (B) containing no pigment, the water-soluble solvent, and other components by using a mixer, such as a bead mill, a homomixer, or a homogenizer that can shear intensely by setting the stirring conditions to suitable conditions.

In addition, a pH level (at 25° C.) of the ink composition for aqueous ballpoint pens of the present disclosure is adjusted to preferably 5 to 10, more preferably 6 to 9.5, by using a pH adjuster or the like from the perspective of usability, safety, stability of the ink itself, and matching with the ink container.

The ink composition for aqueous ballpoint pens of the present disclosure is used in a ballpoint pen provided with a pen tip portion such as a ballpoint pen tip.

The aqueous ballpoint pen of the present disclosure includes a ballpoint pen where, in an ink container (refill) for ballpoint pens equipped with a ball with a diameter of 0.18 to 2.0 mm, accommodated are the ink composition for aqueous ballpoint pens having the above-mentioned composition and, as an ink follower, a material that is not compatible with the aqueous ink composition accommodated in the ink container and has a smaller specific gravity than the aqueous ink composition, for example, polybutene, silicone oil, or mineral oil. As long as the ball having the diameter in the range described above is equipped, the structure of the aqueous ballpoint pen to be used is not particularly limited. In particular, preferred is an aqueous ballpoint pen with a refill where the aqueous ink composition is filled in an ink container of a polypropylene tube, and which has a stainless steel tip (with a cemented carbide ball) at the tip.

Furthermore, the ballpoint pen may be a direct liquid type ballpoint pen having a collector structure (ink retention mechanism) in which a shaft cylinder itself is filled with the ink composition for aqueous ballpoint pens having the composition described above as an ink container.

The ink composition for aqueous ballpoint pens of the present disclosure composed as described above contains at least the colored resin particles (A) and the non-colored resin particles (B). In a case where colored resin particles encapsulating a pigment are used, there is a problem that the pigments is shed to cause deterioration in smooth writing or wear of a tip socket when the ink passes through the gap between the ball and the ball socket; however, due to use of the non-colored resin particles in combination, they serve as a bearing agent (lubricating effect) between the ball and the ball socket, and thus the ink composition for aqueous ballpoint pens achieving excellent smooth writing without causing deterioration of the smooth writing and wear of a tip socket is provided.

Furthermore, by allowing the synergist to be contained in the colored resin particle to be used, the affinity of the pigment to the resin is enhanced, shedding of the pigment is less likely to occur, and thus an aqueous ink composition for writing instruments causing no clogging in an ink flow path and further having excellent smooth writing can be obtained.

EXAMPLES

Next, the present disclosure will be described in more detail using Production Examples 1 and 3 of the colored resin particles (A) to be used, Production Example 2 of the non-colored resin particles (B) to be used, and Examples 1 to 5 of the ink compositions for aqueous ballpoint pens and Comparative Examples 1 and 2. However, the present disclosure is not limited to the following Examples. Furthermore, average particle diameters (D50: μm) of the colored resin particles obtained in Production Examples 1 to 3 were measured by using a particle size distribution analyzer HRA 9320-X100, available from Nikkiso Co., Ltd.

Production Example 1

Production of Colored Resin Particle (A)-1

As an oil phase solution, while 11.6 parts of ethylene glycol monobenzyl ether and 1.8 parts of dispersant (DISPERBYK-ill, available from BYK-Chemie Japan K.K.) were heated to 60° C., 2.0 parts of a pigment (carbon black, Cabot Mogul L, available from Cabot Corporation) and 0.2 parts of a synergist (phthalocyanine pigment derivative, Solsperse 5000, available from The Lubrizol Corporation) were added and adequately dispersed. Next, 9.0 parts by mass of a trimethylolpropane adduct of xylylene diisocyanate (TAKENATE D110N, available from Mitsui Chemicals, Inc.) as a prepolymer was added to prepare an oil phase solution. As an aqueous phase solution, while heating 600 parts by mass of distilled water to 60° C., 15 parts by mass of polyvinyl alcohol (PVA-205, available from Kuraray Co., Ltd.) as a dispersant was dissolved therein to prepare an aqueous phase solution.

The oil phase solution was added to the water phase solution at 60° C., and stirred with a homogenizer for 6 hours for emulsion polymerization, thus completing polymerization. By subjecting the obtained dispersion to centrifugation, colored resin particles (A)-1 were obtained. The average particle diameter (D50) of the colored resin particles (A)-1 was 2.1 μm.

Production Example 2

Production of Non-Colored Resin Particle (B)

As an oil phase solution, while 11.6 parts of ethylene glycol monobenzyl ether was heated to 60° C., 9.0 parts by mass of a trimethylolpropane adduct of xylylene diisocyanate (TAKENATE D110N, available from Mitsui Chemicals, Inc.) as a prepolymer was added to prepare an oil phase solution. As an aqueous phase solution, while heating 600 parts by mass of distilled water to 60° C., 15 parts by mass of polyvinyl alcohol (PVA-205, available from Kuraray Co., Ltd.) as a dispersant was dissolved therein to prepare an aqueous phase solution.

The oil phase solution was added to the water phase solution at 60° C., and stirred with a homogenizer for 6 hours for emulsion polymerization, thus completing polymerization. The obtained dispersion was subjected to centrifugation, and non-colored resin particles (B) were obtained. The average particle diameter (D50) of the non-colored resin particles (B) was 1.5 μm.

Production Example 3

Production of Another Colored Resin Particle (A)-2

Colored resin particles (A)-2 were obtained in the same manner as in Production Example 1 except for changing the amount of the dispersant (DISPERBYK-111, available from BYK-Chemie Japan K.K.) of Production Example 1 to 3.2 parts and not adding the synergist (phthalocyanine pigment derivative, Solsperse 5000, available from The Lubrizol Corporation). The average particle diameter (D50) of the colored resin particles (A)-2 was 2.7 μm.

Examples 1 to 5 and Comparative Examples 1 and 2

Each ink composition for aqueous ballpoint pens was prepared by an ordinary method based on the blending composition listed in Table 1 shown while using the colored resin particles (A) and the non-colored resin particles (B) of Production Examples 1 to 3 described above. For the ink compositions for aqueous ballpoint pens obtained in Examples 1 to 5 and Comparative Examples 1 and 2 described above, ballpoint pens were produced by the following method. The obtained ballpoint pens were evaluated on socket wear and smooth writing by the following methods. These results are shown in Table 1 below.

Preparation of Aqueous Ballpoint Pen

Aqueous ballpoint pens were produced using each of the obtained ink compositions. Specifically, using a holder of a ballpoint pen (trade name: SIGNO UM-100, available from Mitsubishi Pencil Co., Ltd.), a refill consisting of an ink storage tube made of polypropylene having an inner diameter of 4.0 mm and a length of 113 mm, a stainless steel tip (superalloy ball, ball diameter: 0.7 mm) and a joint connecting the storage tube and the tip was filled with each of the aqueous inks described above, and an ink follower composed mainly of a mineral oil was provided at the rear end of the ink, thus making an aqueous ballpoint pen.

Evaluation Method for Wear Test (Holder Wear)

By using each of the aqueous ballpoint pens obtained as described above, a spiral was drawn for 1000 m (end of a pen stroke) by mechanical drawing test, and evaluation was performed based on the following evaluation criteria.

Drawing conditions: 150 gf, drawing angle: 80 degrees, drawing rate: 4.5 mm/min

Evaluation Criteria:
  A: Drawing was completed without any problems.
  B: Drawing was possible till the end of a pen stroke although some faintness was observed.
  C: Significant wear occurred, and drawing became impossible before the end.

Evaluation Method of Smooth Writing

By using each of the aqueous ballpoint pens obtained as described above, a spiral was drawn for 300 m by mechanical drawing test applied in the evaluation described above, and the smooth writing before and after the drawing were evaluated based on the following evaluation criteria.

Drawing conditions: 150 gf, drawing angle: 80 degrees, drawing rate: 4.5 mm/min

Evaluation Criteria
  A: Smooth writing was same
  B: Smooth writing was slightly deteriorated.
  C: Smooth writing was significantly deteriorated.

TABLE 1

|  |  |  | Examples | | | | | Comparative Examples | |
|---|---|---|---|---|---|---|---|---|---|
|  |  |  | 1 | 2 | 3 | 4 | 5 | 1 | 2 |
| Colored resin particle (A)-1 encapsulating pigment (a) | | Production Example 1 | 15 | | 19 | | 19 | 17 | |
| Non-colored resin particle (B) containing no pigment | | Production Example 2 | 2 | 5 | 1 | 8 | 0.5 | | |
| Colored resin particle (A)-2 encapsulating pigment (a) | | Production Example 3 | | 14 | | 9 | | | 16 |
| Thickener | Xanthan gum | KELZAN S (available from Sansho Co., Ltd.) | 0.32 | 0.32 | 0.32 | 0.32 | 0.32 | 0.32 | 0.32 |
| Pigment Dispersant | Styrene acryl | Joncryl 63J (solid cont.: 30%) (available from BASF Japan Ltd.) | 6 | | 6 | 6 | 6 | 6 | 6 |

TABLE 1-continued

|  |  |  | Examples | | | | | Comparative Examples | |
|---|---|---|---|---|---|---|---|---|---|
|  |  |  | 1 | 2 | 3 | 4 | 5 | 1 | 2 |
| pH modifier | Triethanol amine |  | 1.4 | 1.4 | 1.4 | 1.4 | 1.4 | 1.4 | 1.4 |
| Corrosion inhibitor | Benzotriazol |  | 0.3 | 0.3 | 0.3 | 0.3 | 0.3 | 0.3 | 0.3 |
| Preservative | Benziso thiazoline | Bioden 421 (available from Daiwa Chemical Ind. Co., Ltd.) | 0.2 | 0.2 | 0.2 | 0.2 | 0.2 | 0.2 | 0.2 |
| Lubricant | Phosphate | RD-510Y (available from Toho Chemical Ind. Co., Ltd.) | 0.5 | 0.5 | 0.5 | 0.5 | 0.5 | 0.5 | 0.5 |
| Solvent | Propylene glycol |  | 15 | 15 | 15 | 15 | 15 | 15 | 15 |
| Water | Distilled water |  | Balance | Balance | Balance | Balance | Balance | Balance | Balance |
| Socket wear evaluation |  |  | A | A | A | A | B | C | C |
| Smooth writing evaluation |  |  | A | A | A | A | B | C | C |

As is clear from the results in Table 1 above, it was confirmed that the ink compositions for aqueous ballpoint pens of Examples 1 to 5 in the scope of the present disclosure were ink compositions for aqueous ballpoint pens achieving excellent smooth writing without causing deterioration of the smooth writing and wear of a tip socket though colored resin particles encapsulating a pigment were used, in comparison to those of Comparative Examples 1 and 2 outside the scope of the present disclosure.

INDUSTRIAL APPLICABILITY

An aqueous ink composition suitable for aqueous ballpoint pens is provided.

The invention claimed is:

1. An aqueous ink composition suitable for a writing instrument, the composition comprising:
    colored resin particles (A) encapsulating a pigment (a); and
    non-colored resin particles (B) comprising no pigment,
    wherein the pigment (a) is carbon black, encapsulated together with a synergist comprising an acidic functional group in the colored resin particles (A), and
    wherein a (B)/(A) mass content ratio of the non-colored resin particles (B) to the colored resin particles (A) is in a range of from 0.05 to 1.0.

2. The composition of claim 1, wherein a resin component in each of the colored resin particles (A) and the non-colored resin particles (B) is urethane-based.

3. The composition of claim 1, wherein the (B)/(A) mass content ratio of the non-colored resin particles (B) to the colored resin particles (A) is in a range of from 0.05 to 0.5.

4. The composition of claim 1, wherein a (B)/(A) average particle diameter ratio of the non-colored resin particles (B) to the colored resin particles (A) is in a range of from 0.5 to 4.0.

5. The composition of claim 2, wherein the (B)/(A) mass content ratio of the non-colored resin particles (B) to the colored resin particles (A) is in a range of from 0.05 to 0.5.

6. The composition of claim 2, wherein a (B)/(A) average particle diameter ratio of the non-colored resin particles (B) to the colored resin particles (A) is in a range of from 0.5 to 4.0.

7. The composition of claim 3, wherein a (B)/(A) average particle diameter ratio of the non-colored resin particles (B) to the colored resin particles (A) is in a range of from 0.5 to 4.0.

8. The composition of claim 5, wherein a (B)/(A) average particle diameter ratio of the non-colored resin particles (B) to the colored resin particles (A) is in a range of from 0.5 to 4.0.

9. The composition of claim 1, wherein the colored resin particles (A) comprise a urethane-based resin, and
    wherein the non-colored resin particles (B) comprise a urethane-based resin.

10. The composition of claim 1, wherein the colored resin particles (A) comprise the pigment (a) in a range of from 5 to 40 mass %, based on colored resin particle mass.

11. The composition of claim 1, wherein the colored resin particles (A) comprise the pigment (a) in a range of from 10 to 35 mass %, based on colored resin particle mass.

12. The composition of claim 1, wherein the colored resin particles (A) comprise the pigment (a) in a range of from 15 to 25 mass %, based on colored resin particle mass.

13. The composition of claim 1, wherein the synergist comprises a phthalocyanine pigment derivative.

14. The composition of claim 1, wherein the colored resin particles (A) comprise the synergist in a synergist-to-pigment mass ratio of from 0.05 to 0.15.

15. The composition of claim 1, wherein the colored resin particles (A) have an average particle diameter in a range of from 0.1 to 30 μm.

16. The composition of claim 1, wherein the colored resin particles (A) have an average particle diameter in a range of from 0.5 to 20 μm.

17. The composition of claim 1, wherein a mass ratio of the synergist to the pigment (a) is in a range of from 0.01 to 0.2.

18. The composition of claim 1, wherein the colored resin particles (A) comprises a urethane resin.

19. The composition of claim 1, wherein the synergist comprises an azo pigment derivative.

20. The composition of claim 1, wherein the colored resin particles (A) comprises a urethane resin comprising, in polymerized form, xylylene diisocyanate.

* * * * *